US012148324B2

(12) United States Patent
Wojohn et al.

(10) Patent No.: US 12,148,324 B2
(45) Date of Patent: Nov. 19, 2024

(54) MOBILE VALET SIGNAGE

(71) Applicant: The Valet Vault, LLC, Atlanta, GA (US)

(72) Inventors: Zachary Robertson Wojohn, Atlanta, GA (US); Richard Grant Henry, Atlanta, GA (US)

(73) Assignee: The Valet Vault, LLC, Atlanta, GA (US)

( * ) Notice: Subject to any disclaimer, the term of this patent is extended or adjusted under 35 U.S.C. 154(b) by 112 days.

(21) Appl. No.: 17/933,957

(22) Filed: Sep. 21, 2022

(65) Prior Publication Data

US 2023/0103042 A1 Mar. 30, 2023

Related U.S. Application Data

(60) Provisional application No. 63/246,458, filed on Sep. 28, 2021.

(51) Int. Cl.
*G09F 13/18* (2006.01)
*G09F 7/18* (2006.01)

(52) U.S. Cl.
CPC ................ *G09F 13/18* (2013.01); *G09F 7/18* (2013.01); *G09F 2007/1843* (2013.01); *G09F 2007/1878* (2013.01); *G09F 2013/1836* (2013.01); *G09F 2013/1845* (2013.01); *G09F 2013/1881* (2013.01)

(58) Field of Classification Search
CPC .... G09F 13/18; G09F 7/18; G09F 2007/1843; G09F 2007/1878; G09F 2013/1836; G09F 2013/1845; G09F 2013/1881
See application file for complete search history.

(56) References Cited

U.S. PATENT DOCUMENTS

| | | | | | |
|---|---|---|---|---|---|
| 2,791,851 | A * | 5/1957 | Richter | G09F 13/04 248/187.1 |
| 3,087,186 | A * | 4/1963 | Budd | A47L 1/00 248/176.1 |
| 4,280,294 | A * | 7/1981 | Eckberg, II | G09F 15/0056 40/606.15 |
| 5,675,923 | A | 10/1997 | Sarkisian et al. | |
| 6,029,833 | A * | 2/2000 | Yeh | A47F 7/19 211/187 |
| D509,543 | S | 9/2005 | Hillstrom et al. | |
| 8,104,205 | B2 | 1/2012 | Hillstrom et al. | |
| 8,646,196 | B2 | 2/2014 | Glass, Jr. et al. | |
| 9,175,801 | B2 | 11/2015 | Adilman et al. | |
| 10,127,844 | B2 | 11/2018 | Calby et al. | |
| 11,647,834 | B2 * | 5/2023 | Carral O Gorman | A47B 81/06 248/560 |
| 2008/0236005 | A1 | 10/2008 | Isayev et al. | |

(Continued)

*Primary Examiner* — Gary C Hoge
(74) *Attorney, Agent, or Firm* — BakerHostetler

(57) ABSTRACT

Provided here are mobile way-finder signs having changeable panels that are internally illuminated. Internal illumination may be caused by battery-powered LED light bulbs. The sign may include a base, an inner frame, an outer frame, a changeable panel, and a retainer. The sign may include a power toggle switch and interior LEDs and wiring within the inner or outer frames. The sign may include a rechargeable battery pack located under the base in a snap-in holder, and heavy-duty black polyurethane wheels.

11 Claims, 4 Drawing Sheets

(56) References Cited

U.S. PATENT DOCUMENTS

| | | | | |
|---|---|---|---|---|
| 2009/0077849 | A1* | 3/2009 | Glass, Jr. | G09F 15/00 40/606.03 |
| 2009/0100727 | A1* | 4/2009 | Chen | G09F 13/20 40/546 |
| 2009/0158629 | A1* | 6/2009 | Bears | G09F 13/18 362/373 |
| 2011/0232146 | A1* | 9/2011 | Lin | G09F 13/18 40/714 |
| 2014/0150309 | A1 | 6/2014 | Glass, Jr. et al. | |
| 2015/0076312 | A1* | 3/2015 | Angvall | F16M 11/046 211/162 |
| 2015/0107142 | A1* | 4/2015 | Burrous | G09F 13/18 40/714 |
| 2018/0314001 | A1* | 11/2018 | Veenstra | G09F 13/0409 |
| 2019/0251878 | A1* | 8/2019 | Rogers | G09F 7/18 |
| 2020/0074895 | A1* | 3/2020 | Liang | G09F 19/18 |
| 2020/0126460 | A1* | 4/2020 | Huang | G02B 6/0075 |
| 2020/0286411 | A1* | 9/2020 | Koeppel | G09F 15/0012 |
| 2020/0349871 | A1* | 11/2020 | Zhao | G09F 15/0018 |

* cited by examiner

MOBILE VALET SIGNAGE

CROSS REFERENCE TO RELATED APPLICATIONS

This application claims benefit to U.S. Provisional Application No. 63/246,458 filed Sep. 28, 2021, the disclosure of which is herein incorporated by reference in its entirety.

TECHNICAL FIELD

The subject disclosure relates to portable way-finder signs, and more specifically, to internally illuminated portable way-finder signs having changeable panels and that can be internally illuminated using battery-powered white light emitting diode (LED) bulbs.

BACKGROUND

Present models of way-finder signs are not portable and/or are not adequality illuminated such that they are easily visible to drivers passing by. Thus, it is advantageous to improve existing way-finder signs to be both portable and adequately illuminated.

SUMMARY

This Summary is provided to introduce concepts in a simplified form that are further shown or described in this application. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

This invention relates to mobile way-finder signs having changeable panels that are internally illuminated. Mobile, illuminated way-finder signs may be used at valet stations, shopping centers, restaurants, for roadway construction, or any other location where it is desired to have an illuminated sign for a temporary period of time. Internal illumination may be caused by battery-powered LED light bulbs. In one general aspect, the sign may include a base. The sign may include an outer frame. The sign may also include an inner frame, which may include a panel and a plurality of lights sufficient to illuminate the panel.

Implementations may include one or more of the following features. A portable sign where the panel is at least semi-transparent. The portable sign may include at least two wheels coupled to the base. The portable sign may include first and second open areas, where the first open area is defined by space between a top end of the inner frame and a top end of the outer frame, and the second open area is defined by space between a bottom end of the inner frame and a top end of the base. The portable sign may have first and second panels where the plurality of lights are spaced between the first and second panels. The inner frame of the portable sign may include first and second panel parts that define a slot to hold the panel. The portable sign may have a rechargeable battery in electronic communication with the plurality of lights. The rechargeable battery and the plurality of lights may be in further electronic communication with a power switch. The base of the portable sign may include a plurality of gussets.

BRIEF DESCRIPTION OF THE DRAWINGS

The Summary, as well as the following Detailed Description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION

Figure 1:
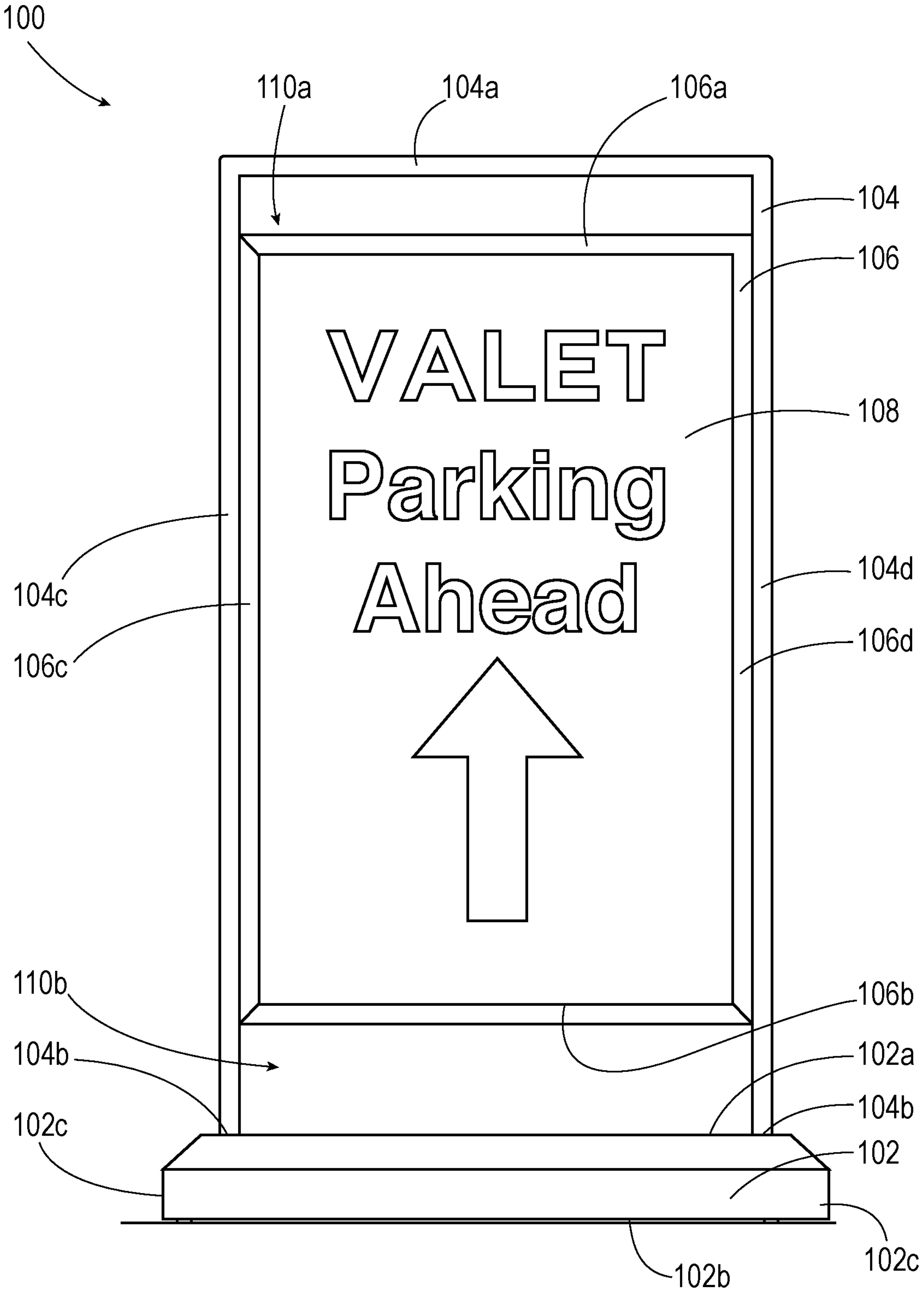
FIG. 1 shows a view of an example mobile way-finder sign.
Figure 2:
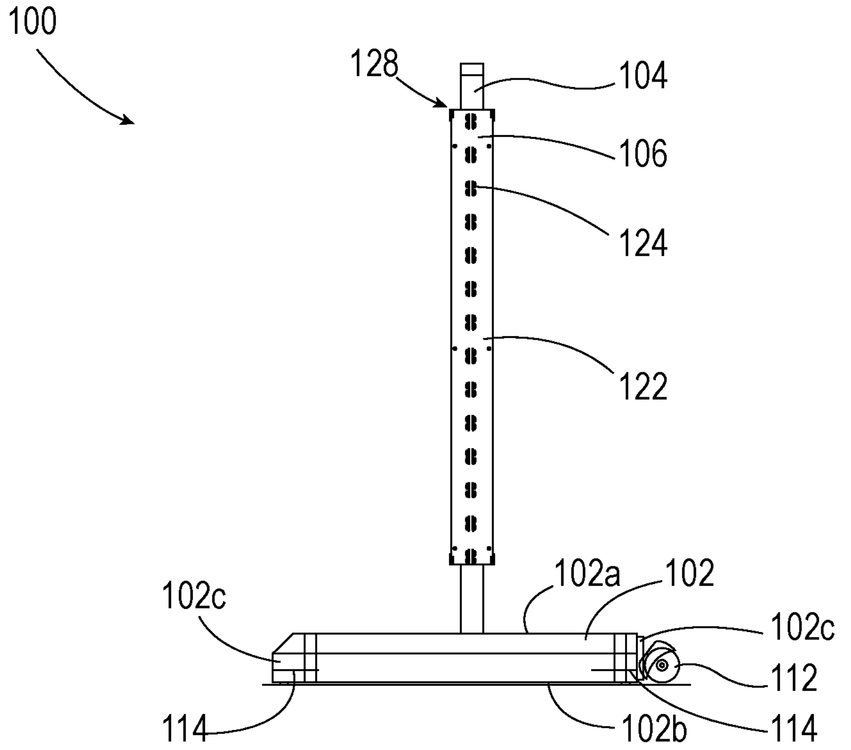
FIG. 2 shows a view of an example mobile way-finder sign.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

FIGS. 1 through 6 show a portable sign 100. The portable sign 100 may comprise a base 102, an outer frame 104, an inner frame 106, at least one panel 108. The portable sign 100 may also comprise one or more open areas 110 such as first and second open areas 110*a* and 110*b*. The open areas 110 allow for savings on materials as well as providing a passage for wind to avoid having the sign blown over. The first open area 110*a* may also act as a handle to allow a user to easily tilt the portable sign 100 onto attached caster wheels (described below) or onto a dolly, for example, so that it may be moved to a different location.

The base may have a first side 102*a* and second side 102*b*. The first side 102*a* may be a top side 102*a* and the second side 102*b* may be a bottom side 102*b*. The second side 102*b* may face the ground on which the portable sign 100 sits and the first side 102*a* may face the opposite direction as the second side. The base may further comprise one or more side surfaces 102*c* that are spaced between the first and second sides 102*a* and 102*b*. The base 102 may be comprised of aluminum, steel, stainless steel, or any other material one skilled in the art would use to construct such a base for a portable sign. It should be appreciated that the portable sign can be comprised of a combination of materials.

Figure 3:
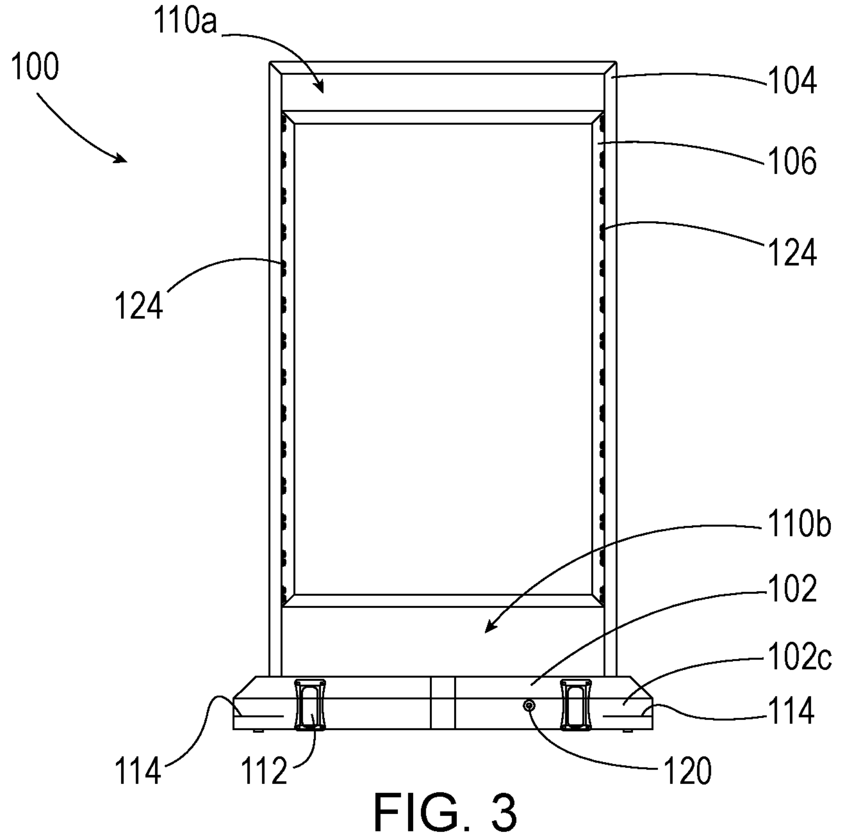
FIG. 3 shows a view of an example mobile way-finder sign.
Figure 4:
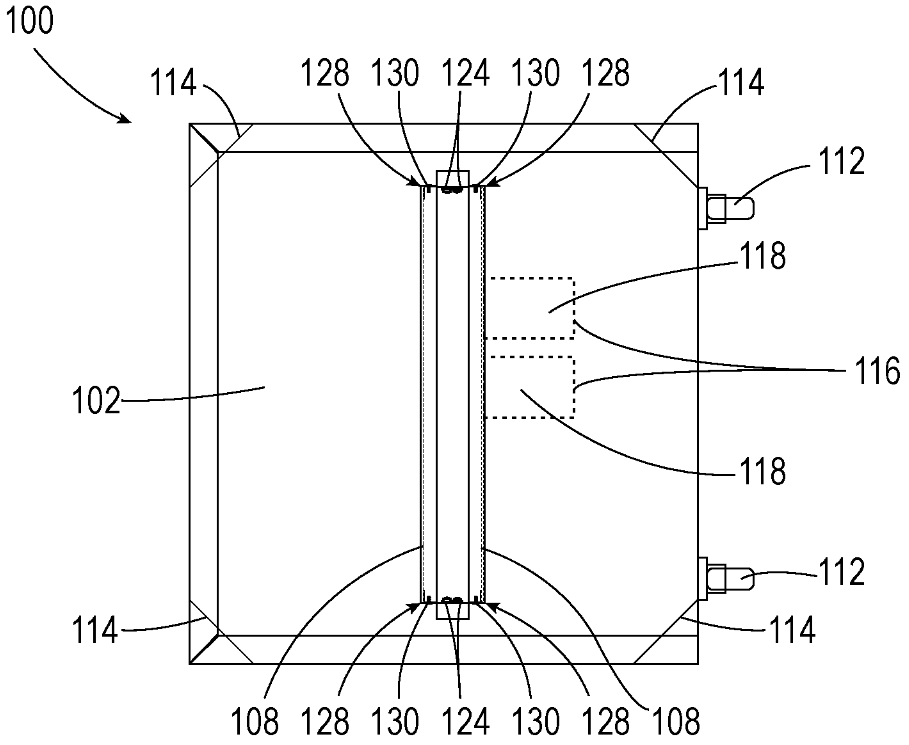
FIG. 4 shows a view of an example mobile way-finder sign.
Figure 5:
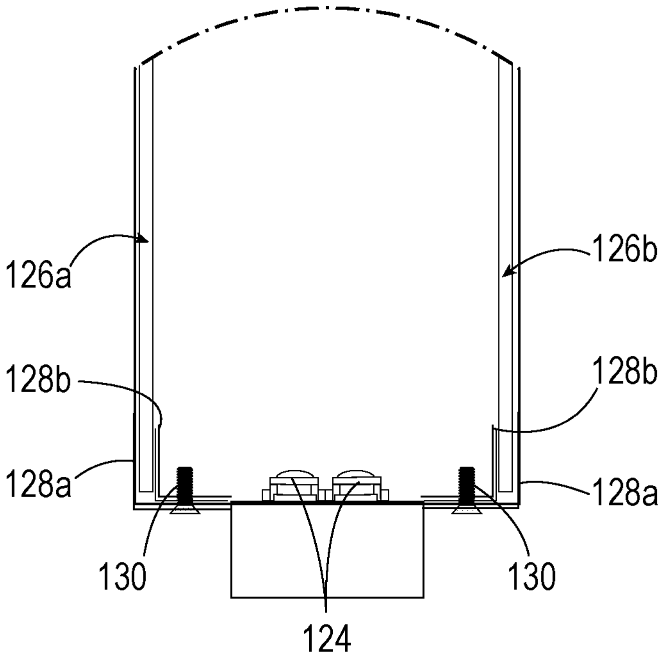
FIG. 5 shows a detailed view of an example mobile way-finder sign.
Figure 6:
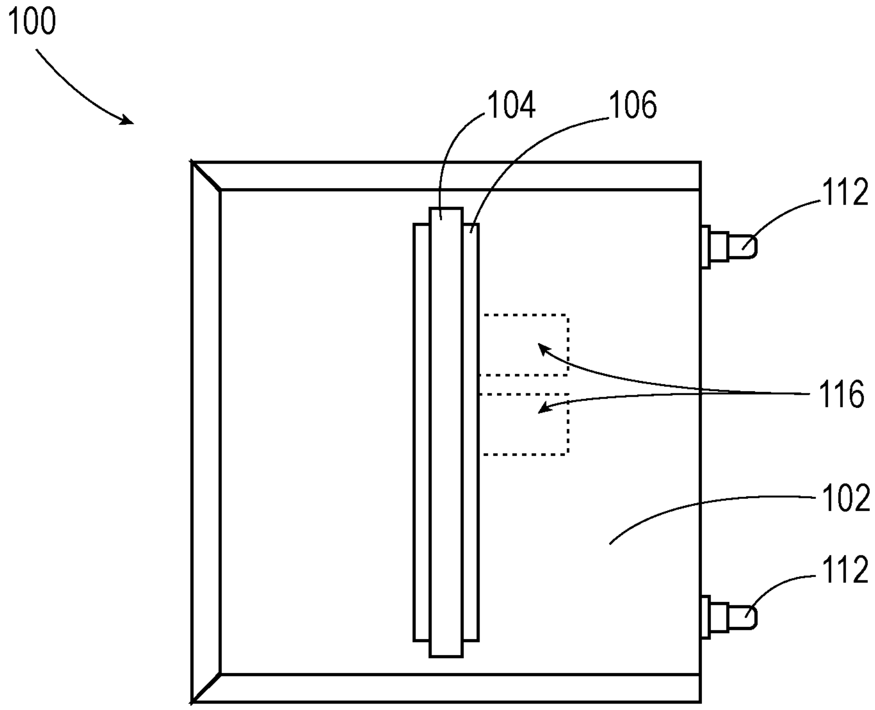
FIG. 6 shows a view of an example mobile way-finder sign.

One or more wheels 112 may be affixed to one or more side surfaces 102*c* of the base 102 such that the sign 100 may be tilted onto the wheels to be moved around, making the sign 100 portable. The wheels may be castor wheels. The base 102 may comprise two wheels 112*v*, as shown in FIGS. 3 and 5. The wheels 112 may be made of polyurethane. The wheels 112 may be mechanically fastened to the base 102 of the sign 100 by a plurality of bolts, wherein the base 102 is configured to securely receive the bolts. The wheels 112 may alternatively or additionally be fastened in any manner sufficient to attach the wheels 112 to the base 102 of the sign 100, such as by welding or using an adhesive.

The base 102 may comprise one or more gussets 114. The gussets 114 may extend from one side surface 102*c* to another. The gussets 114 may be a plate insert or a rod. The gussets 114 may be comprised of aluminum, steel, stainless steel, or any other material one skilled in the art would use to construct such a gusset 114. It should be appreciated that the gussets 114 can be comprised of a combination of materials. The gussets 114 may strengthen the base 102 such that it remains substantially undeformed under the weight of all the components of the sign 100 when the sign 100 is being transported and when it is not moving on the ground.

The base 102 may comprise one or more battery cavities 116 sufficiently sized to house one or more batteries 118. The battery cavity 116 may be accessible only on the bottom side 102*b* of the base. The battery 118 may be a motorcycle battery. The battery 118 may be a 12-volt (V) battery 118. The battery 118 may be in electrical communication with a plurality of lights (as described below) to make the sign 100 appear illuminated when the battery is powered "on." The battery 118 may be rechargeable. The base 102 may further include a power switch 120 used to control the electrical current from the battery 118 to the plurality of lights such that the lights may be turned "on" and "off" without disconnecting the battery 118 from the base 102. The battery 118 may be located under the base in a snap-in holder.

The base 102 may be coupled to the outer frame 104. The outer frame 104 may have a first end 104*a*, a second end 104*b*, a third end 104*c*, and a fourth end 104*d*. The first end 104*a* may be a top end 104*a* and may be spaced away from the base 102. The second end 104*b* may be a bottom end 104*b* and may be spaced from the top end 104*a* toward the base 102. The second end 104*b* of the outer frame 104 may be secured to the base via break forming, welding, or other appropriate mechanical methods under the circumstances. The third and fourth ends 104*c* and 104*d* of the outer frame 104 may be spaced between the first and second ends 104*a* and 104*b*. The outer frame 104 may have a tube construction and may a rectangular cross section. The outer frame 104 may be comprised of aluminum, steel, stainless steel, or any other material one skilled in the art would use to construct such an outer frame 104.

The outer frame 104 may be coupled to the inner frame 106. The inner frame 106 may have a first end 106*a*, a second end 106*b*, a third end 106*c*, and a fourth end 106*d*. The first end 106*a* may be a top end 106*a* and may be spaced away from the base 102. The second end 106*b* may be a bottom end 106*b* and may be spaced from the top end 106*a* toward the base. The second end 106*b* of the inner frame 106 may be secured to the outer frame 104 via a mechanically fastened retainer 122. The third and fourth ends 106*c* and 106*d* of the inner frame 106 may be spaced between the first and second ends 106*a* and 106*b*. The inner frame 106 may have a tube construction and may a rectangular cross section. The inner frame 106 may be comprised of aluminum, steel, stainless steel, or any other material one skilled in the art would use to construct such an inner frame 106. The material of the inner frame 106 may be the same or different than that of the outer frame 104.

The inner frame 106 may comprise a plurality of lights 124. The lights 124 may be coupled to the inside of the inner frame 106 so as not to be viewable when the sign 100 is fully assembled. The lights 124 may be light-emitting diodes (LEDs) 124. The lights 124 may be evenly spaced along the inside of third and fourth ends 106*c* and 106*d* of the inner frame to uniformly light the one or more panels 108 and increase sign readability for people passing by, for example. The sign 100 may appear to those looking at it as if it is internally illuminated. The lights 124 may be in electronic communication with the one or batteries 118 and the power switch 120. The wiring connecting the lights 124 to each other and/or the battery 118 and switch 120 may be concealed within the inner or outer frames 106 and 104 so as not to be exposed to the elements.

The inner frame 106 may comprise one or more slots 126, for example two slots such as a first slot and a second slot 126*a* and 126*b*. The slots 126 may be configured to accommodate a panel 108. The panel(s) 108 may be at least semi-transparent as to allow some light to pass through panels 108, making the sign internally illuminated. The panels 108 may be made from acrylic and/or vinyl. The lights 124 may be spaced between the slots 126.

The inner frame 106 may comprise panel retainers 128 to keep the panels 108 in place in the slot 126 and to allow the panels 108 to be easily interchangeable. The panel retainers 128 may have first and second panel retainer parts 128*a* and 128*b*. The first and second panel retainer parts 128*a* and 128*b* may define the space of the slots 126, such as the first and second slots 126*a* and 126*b*. The first and second slots may be fastened together using a fastener 130. The second retainer part 128*b* may be permanently affixed or otherwise a part of the inner frame 106. To change or remove a panel 108, the fastener 130 may be removed from the first and second retainer parts 128*a* and 128*b*. The first retainer part 128*a* may then also be removed, which then allows the panel 108 to be removed and to be replaced by a new panel 108. This process may also allow for a light 124 to be changed or for other maintenance to be performed on the sign 100. A new panel may be placed against the second retainer part 128*b*, the first retainer part 128*a* placed over the panel 108, and the fastener 130 placed back into place such that it secures the first and second retainer parts 128*a* and 128*b* together to hold the panel 108 in place.

Having thus described the various embodiments, it is to be appreciated and will be apparent to those skilled in the art that the present embodiments are to be considered in all respects as illustrative and not restrictive. Although features and elements are described above in particular combinations, it is to be appreciated that each feature or element can be used alone or in any combination or sub-combination with or without the other features and elements. Any single embodiment described herein can be supplemented with one or more elements from any one or more of the other embodiments described herein. Any single element of an embodiment can be replaced with one or more elements from any one or more of the other embodiments described herein.

The invention claimed is:

1. A portable sign comprising:

a base;

an outer frame; and an inner frame comprising a panel and a plurality of lights sufficient to illuminate the panel, wherein the plurality of lights are disposed within a slot defined by the inner frame.

2. The portable sign of claim 1, wherein the panel is at least semi-transparent.

3. The portable sign of claim 1, further comprising at least two wheels coupled to the base.

4. The portable sign of claim 1, further comprising first and second open areas, wherein the first open area is defined by space between a top end of the inner frame and a top end of the outer frame, and the second open area is defined by space between a bottom end of the inner frame and a top side of the base.

5. The portable sign of claim 1, further comprising first and second panels wherein the plurality of lights are spaced between the first and second panels.

6. The portable sign of claim 5, wherein the first and second panels are interchangeable.

7. The portable sign of claim 1, wherein the inner frame comprises first and second panel parts that define a slot to hold the panel.

8. The portable sign of claim 1, further comprising a rechargeable battery in electronic communication with the plurality of lights.

9. The portable sign of claim 8, wherein the rechargeable battery and the plurality of lights are in further electronic communication with a power switch.

10. The portable sign of claim 1, wherein the base comprises a plurality of gussets.

11. The portable sign of claim 1, wherein the panel is interchangeable.

* * * * *